US012810374B2

(12) United States Patent
Kwon

(10) Patent No.: US 12,810,374 B2
(45) Date of Patent: Nov. 24, 2026

(54) STEREO VISION SYSTEM

(71) Applicant: TEXAS INSTRUMENTS INCORPORATED, Dallas, TX (US)

(72) Inventor: Do-Kyoung Kwon, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 565 days.

(21) Appl. No.: 18/323,466

(22) Filed: May 25, 2023

(65) Prior Publication Data

US 2024/0394828 A1 Nov. 28, 2024

(51) Int. Cl.

*G06T 1/20* (2006.01)
*G06T 3/40* (2024.01)
*G06T 7/174* (2017.01)
*G06T 7/593* (2017.01)

(52) U.S. Cl.

CPC .................. *G06T 1/20* (2013.01); *G06T 3/40* (2013.01); *G06T 7/174* (2017.01); *G06T 7/593* (2017.01); *G06T 2207/10012* (2013.01); *G06T 2207/20021* (2013.01); *G06T 2207/20221* (2013.01)

(58) Field of Classification Search

CPC ......... G06T 19/006; G06T 5/80; G06T 19/20; G06T 2219/2004; G06T 2219/2016; G02B 25/004; G02B 27/017; G06V 10/25; A61B 2090/365; A61B 2090/502; G06F 2203/04805; G06F 3/011; G06F 3/013; G06F 3/04845

USPC ........................................................... 382/154

See application file for complete search history.

(56) References Cited

U.S. PATENT DOCUMENTS

| | | | | | |
|---|---|---|---|---|---|
| 9,111,342 | B2 * | 8/2015 | Choi | G06T 7/593 | |
| 2006/0056727 | A1 * | 3/2006 | Jones | G06V 10/758 | 382/276 |
| 2009/0003687 | A1 * | 1/2009 | Agarwal | G06T 7/30 | 382/154 |
| 2010/0271511 | A1 * | 10/2010 | Ma | H04N 13/25 | 382/254 |
| 2011/0158528 | A1 * | 6/2011 | Yea | G06T 7/593 | 382/218 |
| 2014/0241637 | A1 * | 8/2014 | Schreer | H04N 13/106 | 382/218 |

(Continued)

*Primary Examiner* — Chineyere Wills-Burns
*Assistant Examiner* — Lucius Cameron Green Allen
(74) *Attorney, Agent, or Firm* — Michelle F. Murray; Charles F. Koch

(57) ABSTRACT

A system includes a downsampling circuit, a stereo disparity engine, and a merge circuit. The downsampling circuit is configured to generate a first two-dimensional array by down sampling a second two-dimensional array, and generate a third two-dimensional array by down sampling a fourth two-dimensional array. The stereo disparity engine is configured to generate a first disparity map relating elements of the first two-dimensional array to elements of the third two-dimensional array, generate a second disparity map based on the first disparity map, a first sub-array of the second two-dimensional array and a second sub-array of the fourth two-dimensional array, and generate a third disparity map based on the first disparity map, a third sub-array of the second two-dimensional array and a fourth sub-array of the fourth two-dimensional array. The merge circuit is configured to combine the second disparity map and the third disparity map to generate a fourth disparity map.

20 Claims, 4 Drawing Sheets

(56) References Cited

U.S. PATENT DOCUMENTS

2017/0084014 A1* 3/2017 Moon .................. G06V 20/647
2017/0359561 A1* 12/2017 Vallespi-Gonzalez ....................... H04N 13/239
2017/0374269 A1* 12/2017 Govindarao ......... H04N 23/959
2018/0352209 A1* 12/2018 Liu ...................... H04N 13/122
2019/0318494 A1* 10/2019 Tsai .......................... G06T 7/97
2020/0099920 A1* 3/2020 Khamis ..................... G06T 5/50
2022/0076448 A1* 3/2022 Liu ........................... G06T 7/75
2022/0277470 A1* 9/2022 Xiao ......................... G06T 7/10

* cited by examiner

STEREO VISION SYSTEM

BACKGROUND

Techniques for determining the distance from a camera to an object based on an image captured by the camera have a variety of applications. For example, advanced driver assistance systems may apply such techniques to determine the distance of an object from a vehicle. Stereo depth measurement is a technique for determining depth based on images captured by two or more cameras. Using stereo depth measurement, the distance from the cameras to an object is determined based on the displacement of the object from one image to another.

SUMMARY

In one example, a system includes a downsampling circuit, a stereo disparity engine, and a merge circuit. The downsampling circuit is configured to generate a first two-dimensional array by down sampling a second two-dimensional array, and generate a third two-dimensional array by down sampling a fourth two-dimensional array. The stereo disparity engine is configured to generate a first disparity map relating elements of the first two-dimensional array to elements of the third two-dimensional array, generate a second disparity map based on the first disparity map, a first sub-array of the second two-dimensional array and a second sub-array of the fourth two-dimensional array, and generate a third disparity map based on the first disparity map, a third sub-array of the second two-dimensional array and a fourth sub-array of the fourth two-dimensional array. The merge circuit is configured to combine the second disparity map and the third disparity map to generate a fourth disparity map.

In another example, a method includes partitioning a first array into a first sub-array and a second sub-array, and partitioning a second array into a third sub-array and a fourth sub-array. The method also includes generating a first disparity map relating the first sub-array to the third sub-array, and generating a second disparity map relating the second sub-array to the fourth sub-array. The method further includes merging the first disparity map and the second disparity map to produce a third disparity map relating the first array to the second array.

In a further example, an integrated circuit includes a processor and a stereo depth engine. The stereo depth engine is coupled to the processor. The processor is configured to downsample a first image to produce a second image, and downsample a third image to produce a fourth image. The stereo depth engine is configured to generate a first disparity map relating the second image and the fourth image. The processor is configured to partition the first image into a first sub-image and a second sub-image based on the first disparity map; and partition the third image into a third sub-image and a fourth sub-image based on the first disparity map. The stereo depth engine is configured to generate a second disparity map relating the first sub-image and the third sub-image, and generate a third disparity map relating the second sub-image and the fourth sub-image. The processor is configured to combine the second disparity map and the third disparity map to produce a fourth disparity map relating the first image and the third image.

DETAILED DESCRIPTION

In some stereo vision systems, the cameras are provided in a single modular unit, which allows the cameras to be easily incorporated in a higher-level assembly. However, in such modular units, the distance between the cameras is relatively small (e.g., 12-30 centimeters), which may limit the displacement of objects across images captured by the cameras, and limit the depth measurement capabilities of the system. To provide improved depth measurement, some stereo vision systems forgo the convenience of modular assemblies, and include cameras with high-resolution (e.g., 8-16 megapixel or higher) image sensors that are mounted relatively far apart (e.g., 1-2 meters apart). The wider spacing between the cameras increases the distance between corresponding pixels of the stereoscopic images. Hardware accelerators designed to process such images may have relatively large memories to store the high-resolution images and a relatively large disparity search range (e.g., 800 pixel) to identify corresponding pixels. These features increase circuit size and cost.

The stereo vision system described herein reduces overall system cost by employing a hardware accelerator (a stereo disparity engine/stereo depth engine) having smaller memories and lower disparity search range to process high-resolution images acquired from widely spaced cameras. The system downsamples the high-resolution images and generates a reference disparity map based on the downsampled images. The system partitions the high-resolution images into overlapping sub-images based on the reference disparity map, and generates disparity maps for stereo sub-images. The system merges the reference disparity map and the sub-image disparity maps to produce a disparity map for the high-resolution images.

Figure 1:
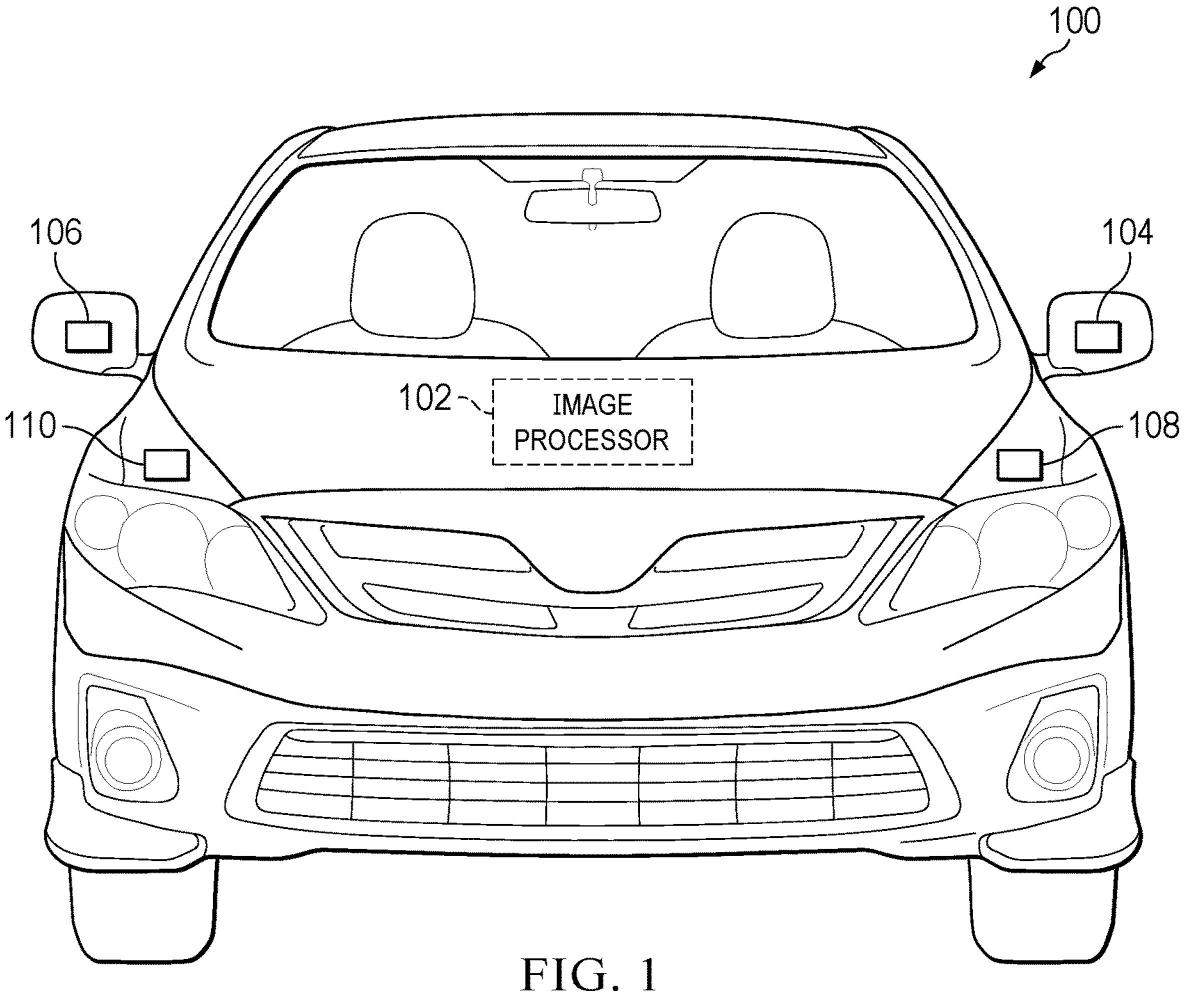
FIG. 1 is an example of a stereo vision system with wide camera displacement incorporated in a vehicle.

FIG. 1 is an example of a stereo vision system with wide camera displacement incorporated in a vehicle 100. The stereo vision system includes an image processor 102 and at least two cameras. For example, the stereo vision system may include cameras 104 and 106 positioned on respective side mirrors in one implementation. Another implementation of the stereo vision system may include cameras 108 and 110 positioned above respective front headlight assemblies. Cameras 108 and 110 may be used in place of or in addition to the cameras 104 and 106. Other camera mounting arrangements different than that shown in FIG. 1 may be employed. The cameras are communicatively coupled (e.g., coupled via conductors) to the image processor 102. The image processor 102 receives images captured by the cameras and processes the images to determine the distance of objects in the images from the vehicle 100. The image processor 102 may implement disparity mapping as described herein to determine the distance of objects in the images received from the cameras from the vehicle 100.

Figure 2:
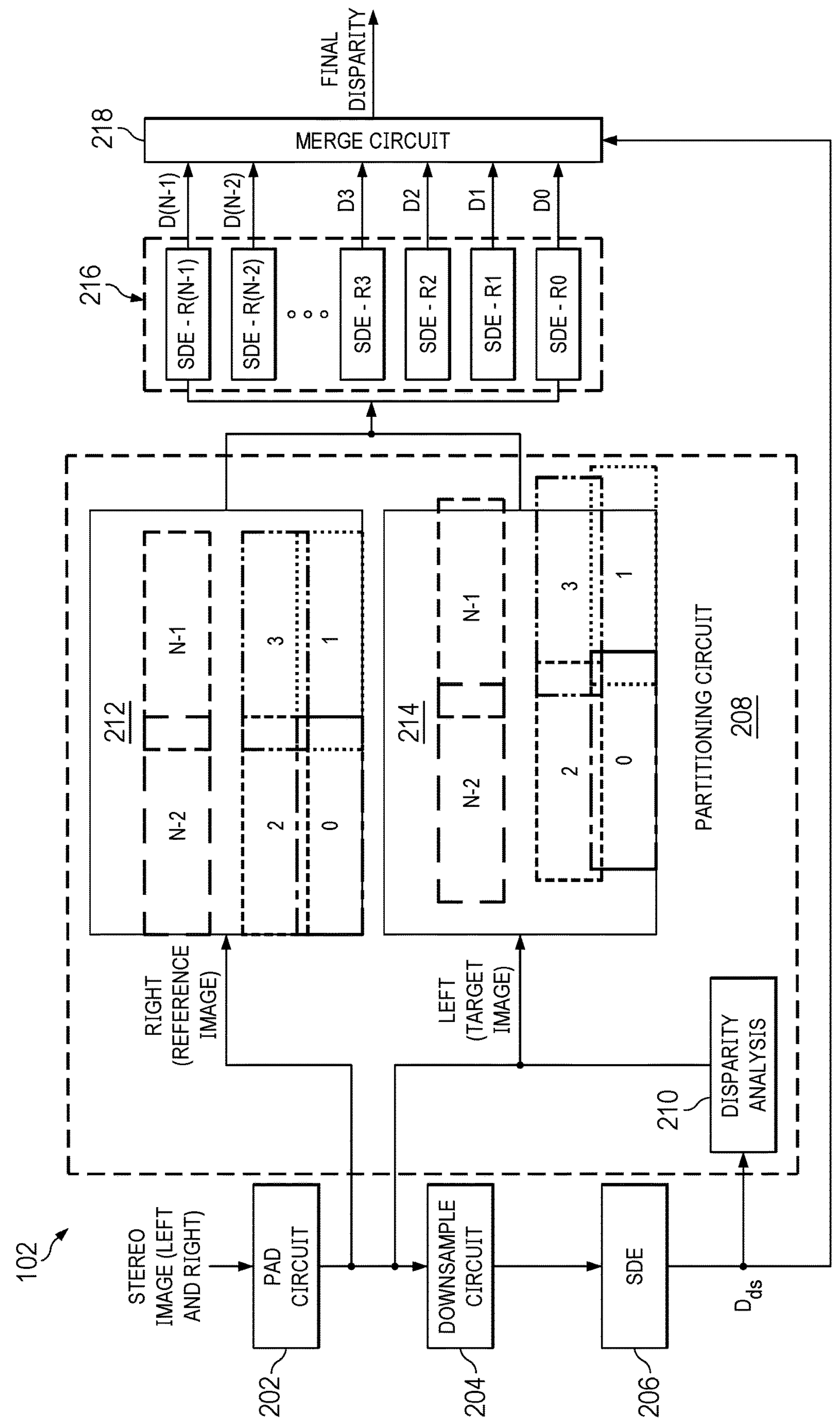
FIG. 2 is a block diagram of an example data flow for disparity processing in a stereo vision system.

FIG. 2 is a block diagram of an example data flow for disparity processing in the image processor 102. The image processor 102 receives stereo images (e.g., left and right images) from the cameras 104 and 106. The images are two-dimensional arrays of light intensity (and color data) captured by the cameras 104 and 106. The images received from the cameras 104 and 106 may be referred to as full-resolution images or high-resolution images. Each image may be relatively large (e.g., 3840×2160 pixels). A pad circuit 202 of the image processor 102 pads the images by adding pixels to the edges of the image to increase the image size (the number of rows or columns) to a multiple of a selected value (e.g., a multiple of 64). For example, the padding may increase the size of each of the stereo images (each two-dimensional array of image data) to 3840×2176 in some implementations.

A downsample circuit 204 of the image processor 102 downsamples the padded images to produce images of a size suitable for disparity processing by a stereo disparity engine (SDE) (e.g., a hardware accelerator) of the image processor 102. For example, the high-resolution images padded in the pad circuit 202 may be too large to be processed by the stereo disparity engine, and the downsampling may produce images (two-dimensional arrays) having a resolution (e.g., 960×544) compatible with the SDE. The padded images may be downsampled by a factor of four in some implementations. Other downsampling factors may be used consistent with the teachings herein.

In block 206, the SDE processes the downsampled images produced by the downsample circuit 204 to generate a disparity map (a reference disparity map ($D_{ds}$))) for the downsampled images. The reference disparity map specifies the distance between pixels in the downsampled images.

A disparity analysis 210 is performed on reference disparity map ($D_{ds}$) using a partitioning circuit 208 of the image processor 102. The partitioning circuit 208 analyzes the reference disparity map and partitions (subdivides) the high-resolution stereo images (e.g., the padded stereo images) into smaller overlapping sub-images (sub-arrays). For example, the image processor 102 may partition the high-resolution images into N (e.g., 12 sub-images). Adjacent sub-images derived from a high-resolution image may overlap horizontally and vertically. In one example, a sub-image may be 2048×320 pixels in size, and overlap neighboring sub-images by 8 pixels vertically and 196 pixels horizontally (where the SDE disparity search range is 192). The sub-image size and overlap may differ in other examples.

One of the high-resolution images may be referred to as a reference image and the other of the high-resolution images may be referred to as a target image. FIG. 2 shows the reference image 212 and the target image 214, and the N sub-images derived from each. The partitioning circuit 208, of the disparity analysis 210, partitions the reference disparity map in the same way as the reference image 212. For each sub-image i=0, . . . , N−1, the image processor 102 determines the minimum and maximum disparity [min_disparity(i), max_disparity(i)] from the reference disparity map. The image processor 102 builds a disparity histogram from the pixels in each sub-image. Bins of the histogram having less than 1% of the number of pixels in the sub-image may be suppressed. The image processor 102 may determine the maximum and minimum disparity values for a sub-image, such that the difference of the maximum and minimum disparities is not greater than the SDE search range (e.g., 192 pixels) divided by the downsampling factor. For example, max_disparity(i)−min_disparity(i)≤192/scale, where scale is the downsampling factor. The image processor 102 may also determine the maximum and minimum disparity values for a sub-image, such that the number of pixels in the sub-image is maximized.

For each sub-image of the reference image 212, the image processor 102 extracts a sub-image from the target image 214. The sub-image of the target image may be shifted relative to the sub-image of the reference image. For example, a sub-image of the target image 214 may be taken from the same rows as the sub-image of the reference image 212, but from different columns. FIG. 2 shows the sub-images of the target image 214 shifted to the right relative to the corresponding (the same index valued) sub-images of the reference image 212 to account for different positioning of objects in the two images. The image processor 102 may determine the number of pixels to shift a given sub-image of the target image 214 based on the minimum disparity value for the corresponding partition of the reference disparity map (shift_offset(i)=min_disparity(i)*scale).

In block 216, the SDE generates a disparity map for each pair of sub-images (reference image sub-image(i) and target image sub-image(i)). The disparity maps relate the pixels of each sub-image of the reference image 212 to the pixels of a corresponding sub-image of the target image 214.

In a merge circuit 218, the image processor 102 merges (combines) the reference disparity map and the sub-image disparity maps to produce a final disparity map for the high-resolution stereo images. In some examples, the image processor 102 combines the disparities as an average of the sub-image disparity and the scaled reference disparity. For example, the image processor 102 may generate a pixel of the final disparity map as:

$$\text{if } (|d_{sub,i}(x', y') + \text{shift\_offset}(i) - \text{scale} * d_{ds}(x'', y'')| < Th), \text{ then}$$

$$d(x, y) = \frac{d_{sub,i}(x', y') + \text{shift\_offset}(i) + \text{scale} * d_{ds}(x'', y'')}{2}$$

$$\text{else}$$

$$d(x, y) = 0$$

where:

d(x,y) is a disparity of a pixel (x,y) in the high-resolution reference image;

(x,y) maps to (x',y') in the i-th sub-image and (x",y") in the reference disparity map; scale is the downsampling factor; and Th is a threshold value.

If the if the difference of the sub-image disparity and the reference disparity for a pixel exceeds the threshold value (Th), then the disparity value for the pixel may be set to zero or another selected (e.g., constant) value.

Figure 3:
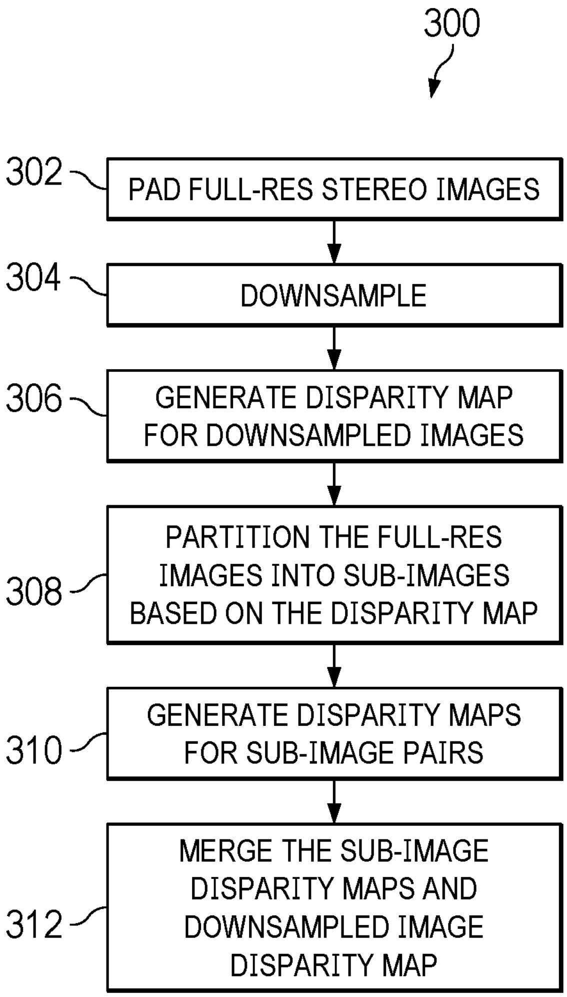
FIG. 3 is a flow diagram for an example method of disparity processing in a stereo vision system.

FIG. 3 is a flow diagram for an example method 300 of disparity processing in a stereo vision system. Though depicted sequentially as a matter of convenience, at least some of the actions shown can be performed in a different order and/or performed in parallel. Additionally, some implementations may perform only some of the actions shown. Operations of the method 300 may be performed by the image processor 102.

In block 302, the image processor 102 receives full-resolution (high-resolution) stereo images from first and second cameras, e.g., the camera 104 and the camera 106, and the image processor 102 pads the images by adding pixels to the edges of the images to increase the image size to a multiple of a selected value (e.g., a multiple of 64). For example, if the received images are 3840×2160 pixels, the padding may increase the size of each image to 3840×2176 in some implementations.

In block 304, the image processor 102 downsamples the padded images to produce images of a size suitable for disparity processing by a stereo disparity engine (SDE) (a hardware accelerator) of the image processor 102. For example, the padded images produced in block 302 may be too large to be processed by the stereo disparity engine of the image processor 102, and the downsampling may produce images having a resolution compatible with the SDE. The padded images may be downsampled by a factor of four in some implementations, so 960×544 images may be generated from 3840×2176 images.

In block 306, the SDE of the image processor 102 processes the downsampled images produced in block 304 to generate the reference disparity map ($D_{ds}$))) for the downsampled images. The reference disparity map specifies the distance between pixels in the downsampled images.

In block 308, the image processor 102 analyzes the reference disparity map and partitions (subdivides) the high-resolution stereo images (e.g., the padded reference and target images) into smaller overlapping sub-images (sub-arrays) as illustrated in FIG. 2. For example, the image processor 102 may partition the padded high-resolution images into N (e.g., 12 sub-images). Adjacent sub-images derived from a high-resolution image may overlap horizontally and vertically. In one example, a sub-image may be 2048×320 pixels in size, and overlap neighboring sub-images by 8 pixels vertically and 196 pixels horizontally (where the SDE disparity search range is 192). The sub-image size and overlap may differ in other examples.

For each sub-image i=0, . . . , N−1, the image processor 102 determines the minimum and maximum disparity [min_disparity(i), max_disparity(i)] from the reference disparity map. The image processor 102 builds a disparity histogram from the pixels in each sub-image. Bins of the histogram having less than 1% of the number of pixels in the sub-image may be suppressed. The image processor 102 may determine the maximum and minimum disparity values for a sub-image, such that the difference of the maximum and minimum disparities is not greater than the SDE search range divided by the downsampling factor. For example, max_disparity(i)−min_disparity(i)≤192/scale, where scale is the downsampling factor. The image processor 102 may also determine the maximum and minimum disparity values for a sub-image, such that the number of pixels in the sub-image is maximized.

For each sub-image of the reference image 212, the image processor 102 extracts a sub-image from the target image. The sub-image of the target image 214 may be shifted relative to the sub-image of the reference image. For example, a sub-image of the target image may be taken from the same rows as the sub-image of the reference image, but from different columns (shifted as shown in FIG. 2). The image processor 102 may determine the number of pixels to shift a given sub-image of the target image 214 based on the minimum disparity value for the corresponding partition of the reference disparity map (shift_offset(i)=min_disparity(i) *scale).

In block 310, the SDE of the image processor 102 generates a disparity map for each pair of sub-images (reference image sub-image(i) and target image sub-image (i)) produced in block 308. The disparity maps relate the pixels of each sub-image of the reference image 212 to the pixels of a corresponding sub-image of the target image 214.

In block 312, the image processor 102 merges (combines) the reference disparity map produced in block 306 and the sub-image disparity maps generated in block 310 to produce a final disparity map for the high-resolution stereo images. The image processor 102 may combine the disparities as an average of the sub-image disparity and the scaled reference disparity. If the difference of the sub-image disparity and the reference disparity for a pixel exceeds a threshold value, then the disparity value for the pixel may be set to zero or another selected value.

Figure 4:
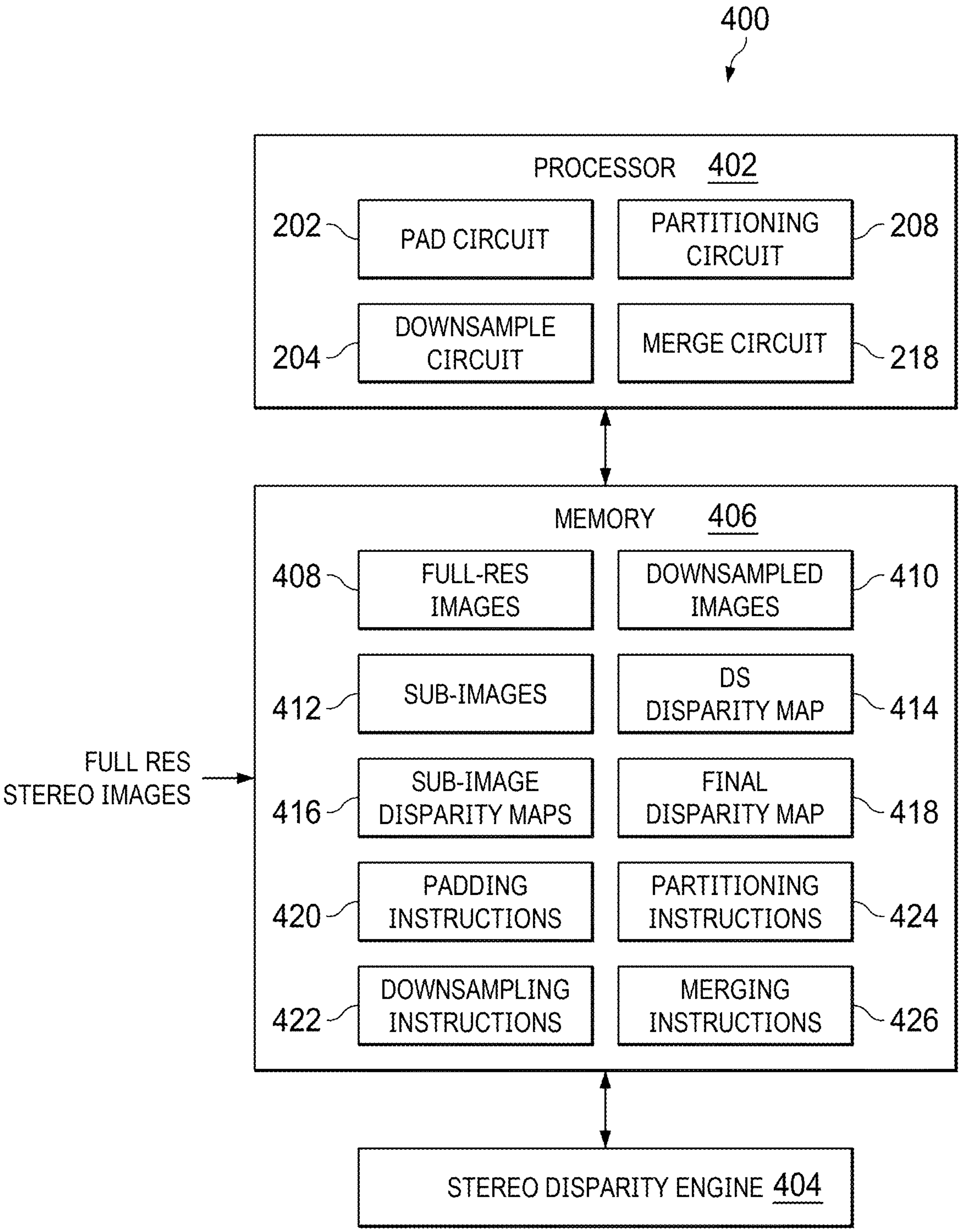
FIG. 4 is a block diagram of an example image processing system suitable for implementing the stereo vision system of FIG. 1.

FIG. 4 is a block diagram of an example image processing system 400 suitable for implementing the image processor 102 and performing the processing FIG. 2 and the method 300. The image processing system 400 may be implemented in an integrated circuit, such as a system-on-chip. The image processing system 400 includes a processor 402, an SDE (a stereo disparity engine/stereo depth engine) 404, and a memory 406. The processor 402 may be a general-purpose microprocessor core, a digital signal processor, or other instruction execution device suitable for processing stereo images. The SDE 404 is, e.g., a hardware accelerator configured to process stereo images and generate a disparity map relating the pixels of the stereo images. The image processing system 400 may include other circuits that are not shown in FIG. 4. For example, the image processing system 400 may include communication circuits, timing circuits, and other peripheral or processing circuits that are not shown in FIG. 4.

The processor 402 and the SDE 404 are coupled to the memory 406. The memory 406 is a non-transitory computer-readable medium and may include volatile and/or non-volatile memory, such as static random-access memory, dynamic random-access memory, FLASH memory, and/or other types of memory. The memory 406 stores data processed by the processor 402 and the SDE 404 and stores instructions executed by the processor 402. The data stored in the memory 406 includes the full-resolution (high-resolution) images 408 received from cameras, e.g., the camera 104 and the camera 106, the downsampled images 410, the reference disparity map 414, the sub-images 412, the sub-image disparity maps 416, and the final disparity map 418.

The instructions stored in the memory 406 include padding instructions 420, downsampling instructions 422, partitioning instructions 424, and merging instructions 426. The full-resolution images 408 may be moved into the memory 406 using direct memory access or through the processor 402. The processor 402 may execute the padding instructions 420 to implement the pad circuit 202 that pads the full-resolution images 408. The processor 402 may execute the downsampling instructions 422 to implement the downsample circuit 204 that downsamples (e.g., by four) the padded images to generate the downsampled images 410. The SDE 404 processes the downsampled images 410 to generate the reference disparity map 414.

The processor 402 executes the partitioning instructions 424 to implement the partitioning circuit 208 that processes the reference disparity map 414 and the full-resolution images 408 as described herein to generate the sub-images 412. The SDE 404 processes the sub-images 412 to generate the sub-image disparity maps 416. The processor 402 executes the merging instructions 426 to implement the merge circuit 218 that combines the sub-image disparity maps 416 and the reference disparity map 414 as described herein to produce the final disparity map 418. The final disparity map 418 may be further processed by the processor 402 or provided (by the processor 402 or other circuit) to a system that determines a distance from the camera 104 and the camera 106 to an object in the stereo images. In the vehicle 100, an operator alert (e.g., an audio, video, or tactile alert) may be generated or the operation of the vehicle 100 may be controlled (e.g., braking activated) based on the final disparity map 418 and distance to an object determined based on the final disparity map 418.

As the foregoing describes, the SDE, e.g., SDE 404, is configured to provide high-performance stereo vision, which may be incorporated in advanced driver assistance systems. In some implementations, an inexpensive, low-performance hardware accelerator may be configured to provide the functionality of the SDE described herein to provide a compact, high performance, low cost stereo vision solution.

The same reference numbers or other reference designators are used in the drawings to designate the same or similar (either by function and/or structure) features.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more active or passive elements or subsystems may instead include only a subset of the elements and may be adapted to be coupled to at least some of the elements to form the described structure either at a time of manufacture or after a time of manufacture, for example, by an end-user and/or a third-party.

Circuits described herein are reconfigurable to include additional or different components to provide functionality at least partially similar to functionality available prior to the component replacement.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Modifications are possible in the described embodiments, and other embodiments are possible, within the scope of the claims.

What is claimed is:

1. A system comprising:

a downsampling circuit configured to:

generate a first two-dimensional array by down sampling a second two-dimensional array; and generate a third two-dimensional array by down sampling a fourth two-dimensional array;

a stereo disparity engine coupled to the downsampling circuit, wherein the stereo disparity engine is configured to generate a first disparity map relating elements of the first two-dimensional array to elements of the third two-dimensional array;

a partitioning circuit coupled to the stereo disparity engine, wherein the partitioning circuit is configured to:

partition the second two-dimensional array to a first sub-array and a second sub-array based on the first disparity map; and partition the fourth two-dimensional array to a third sub-array and a fourth sub-array based on the first disparity map;

wherein the stereo disparity engine is configured to:

generate a second disparity map based on the first disparity map, the first sub-array of the second two-dimensional array and the third sub-array of the fourth two-dimensional array; and generate a third disparity map based on the first disparity map, the second sub-array of the second two-dimensional array and the fourth sub-array of the fourth two-dimensional array; and a merge circuit coupled to the stereo disparity engine, wherein the merge circuit is configured to combine the first disparity map, the second disparity map, and the third disparity map to generate a fourth disparity map.

2. The system of claim 1, wherein the fourth disparity map, the second two-dimensional array, and the fourth two-dimensional array are higher in resolution than the first disparity map, the first two-dimensional array, and the third two-dimensional array.

3. The system of claim 1, wherein:

the first sub-array overlaps the second sub-array; and the third sub-array overlaps the fourth sub-array.

4. The system of claim 1, wherein the partitioning circuit is configured to select the elements of the first sub-array and the third sub-array such that a maximum disparity of the elements is less than a selected disparity.

5. The system of claim 4, wherein the partitioning circuit is configured to maximize a number of elements of the first sub-array and the third sub-array.

6. The system of claim 1, wherein the merge circuit is configured to generate a value of the fourth disparity map as an average of a corresponding value of the second disparity map and a corresponding scaled value of the first disparity map.

7. The system of claim 1, wherein the merge circuit is configured to set a value of the fourth disparity map to a constant based on a difference of a corresponding value of the second disparity map and a corresponding scaled value of the first disparity map exceeding a threshold.

8. The system of claim 1, wherein the second two-dimensional array and the fourth two-dimensional array are stereoscopic images.

9. A method comprising:

downsampling a first array to generate a third array;

downsampling a second array to generate a fourth array; and generating a fourth disparity map relating the third array to the fourth array partitioning the first array into a first sub-array and a second sub-array based on the fourth disparity map;
partitioning the second array into a third sub-array and a fourth sub-array based on the fourth disparity map;
generating a first disparity map relating the first sub-array to the third sub-array;
generating a second disparity map relating the second sub-array to the fourth sub-array; and
merging the fourth disparity map, the first disparity map, and the second disparity map to produce a third disparity map relating the first array to the second array.

10. The method of claim 9, further comprising selecting elements of the first array to include in the first sub-array or the second sub-array such that a maximum disparity of the elements is less than a selected disparity.

11. The method of claim 10, further comprising maximizing a number of elements of the first sub-array and the second sub-array.

12. The method of claim 9, wherein the merging includes generating a value of the third disparity map as an average of a corresponding value of the first disparity map and a corresponding scaled value of the fourth disparity map.

13. The method of claim 9, wherein the merging includes setting a value of the third disparity map to a constant based on a difference of a corresponding value of the first disparity map and a corresponding scaled value of the fourth disparity map exceeding a threshold.

14. The method of claim 9, wherein:
the first sub-array overlaps the second sub-array; and
the third sub-array overlaps the fourth sub-array.

15. An integrated circuit comprising:
a processor; and
a stereo depth engine coupled to the processor;
wherein:
the processor is configured to downsample a first image to produce a second image, and downsample a third image to produce a fourth image;
the stereo depth engine is configured to generate a first disparity map relating the second image and the fourth image;
the processor is configured to partition the first image into a first sub-image and a second sub-image based on the first disparity map; and partition the third image into a third sub-image and a fourth sub-image based on the first disparity map;
the stereo depth engine is configured to generate a second disparity map relating the first sub-image and the third sub-image, and generate a third disparity map relating the second sub-image and the fourth sub-image; and
the processor is configured to combine the second disparity map and the third disparity map to produce a fourth disparity map relating the first image and the third image.

16. The integrated circuit of claim 15, wherein the processor is configured to select pixels of the first image to include in the first sub-image or the second sub-image such that a maximum disparity of the pixels indicated by the first disparity map is less than a selected disparity.

17. The integrated circuit of claim 15, wherein the processor is configured to generate a disparity value for a pixel of the fourth disparity map associated with a pixel as an average of a disparity value of the second disparity map associated with the pixel and a scaled disparity value of the first disparity map associated with the pixel.

18. The integrated circuit of claim 17, wherein the processor is configured to set a disparity value of the fourth disparity map associated with a pixel to a constant based on a difference of a disparity value of the second disparity map associated with the pixel and a scaled disparity value of the first disparity map associated with the pixel exceeding a threshold.

19. The integrated circuit of claim 15, wherein the first sub-image overlaps the second sub-image, and wherein the third sub-image overlaps the fourth sub-image.

20. The integrated circuit of claim 15, wherein the first and third images are stereoscopic images.

* * * * *